(12) United States Patent
Liao et al.

(10) Patent No.: US 11,204,126 B2
(45) Date of Patent: Dec. 21, 2021

(54) FIREPROOF CLADDING MATERIAL OF PLASTIC PIPELINE

(71) Applicant: NAN YA PLASTICS CORPORATION, Taipei (TW)

(72) Inventors: Te-Chao Liao, Taipei (TW); Chun-Che Tsao, Taipei (TW); Shih-Hsun Yen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 24 days.

(21) Appl. No.: 16/535,821

(22) Filed: Aug. 8, 2019

(65) Prior Publication Data
US 2020/0056736 A1    Feb. 20, 2020

(30) Foreign Application Priority Data
Aug. 14, 2018 (TW) ................. 107128327

(51) Int. Cl.
*F16L 59/02* (2006.01)
*B32B 5/02* (2006.01)
(Continued)

(52) U.S. Cl.
CPC ............ *F16L 59/026* (2013.01); *B32B 5/024* (2013.01); *B32B 5/06* (2013.01); *B32B 7/10* (2013.01);
(Continued)

(58) Field of Classification Search
CPC ..... F16L 59/026; F16L 59/029; F16L 59/143; F16L 59/145; F16L 57/04; B32B 5/024; B32B 5/06; B32B 7/10; B32B 2597/00; B32B 2307/3065; B32B 5/02; B32B 5/26; B32B 33/00; B32B 2250/20;
(Continued)

(56) References Cited

U.S. PATENT DOCUMENTS 4,177,181 A * 12/1979 Tsurumi ................. C08L 21/02
524/822
5,795,834 A * 8/1998 Deeb ....................... B32B 27/36
442/62

(Continued)

FOREIGN PATENT DOCUMENTS

CN       101120199 A    2/2008
CN       202660154 U    1/2013
(Continued)

*Primary Examiner* — Brian Handville
(74) *Attorney, Agent, or Firm* — Li & Cai Intellectual Property (USA) Office

(57) ABSTRACT

A fireproof cladding material for covering or coating a plastic pipeline, includes a cross-sectional structure formed by needle punch or thermal bond to form a two-layer or three-layer laminated structure with an integrated structure. The laminated structure of the cross-sectional structure is composed of a fireproof fiber woven blanket having a thickness of 0.2-250 mm, and an upper side or a lower side of the fireproof fiber woven blanket, or both sides of the upper side and the lower side thereof, is composed of a fireproof reinforcement layer with a thickness of 0.015-0.5 mm. The fireproof cladding material has the characteristics of softness, bendability, light weight and high strength, and is suitable for covering or coating plastic pipelines.

4 Claims, 2 Drawing Sheets

(51) Int. Cl.
  *B32B 5/06* (2006.01)
  *B32B 7/10* (2006.01)
(52) U.S. Cl.
  CPC ..... *F16L 59/029* (2013.01); *B32B 2307/3065* (2013.01); *B32B 2597/00* (2013.01)
(58) Field of Classification Search
  CPC ............ B32B 2250/40; B32B 2255/02; B32B 2255/26; B32B 2262/0246; B32B 2262/105; B32B 2262/101; B32B 2262/106; B32B 2307/718; H02G 3/0412; C09D 183/04; C09D 5/18; C09J 7/29
  See application file for complete search history.

(56) References Cited

U.S. PATENT DOCUMENTS

| | | | |
|---|---|---|---|
| 5,976,997 | A | 11/1999 | Meaney et al. |
| 2012/0040161 | A1* | 2/2012 | Weidinger ............... F24S 80/65 428/215 |
| 2012/0144794 | A1* | 6/2012 | Ke ........................... B32B 5/02 57/90 |
| 2018/0100256 | A1 | 4/2018 | Handermann et al. |

FOREIGN PATENT DOCUMENTS

| | | |
|---|---|---|
| CN | 202982995 U | 6/2013 |
| CN | 205970239 U | 2/2017 |
| CN | 206030676 U | 3/2017 |
| KR | 101223263 B1 | 1/2013 |

* cited by examiner

FIREPROOF CLADDING MATERIAL OF PLASTIC PIPELINE

CROSS-REFERENCE TO RELATED PATENT APPLICATION

This application claims the benefit of priority to Taiwan Patent Application No. 107128327, filed on Aug. 14, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a fireproof cladding material, and more particularly to a fireproof cladding material for coating a plastic pipeline.

BACKGROUND OF THE DISCLOSURE

Generally, a sewage pipe and a wire pipeline in a house or building (hereinafter referred to as a plastic pipeline of a building) is a flammable plastic product. When a fire occurs, the plastic pipeline will not only help the fire, but also generate smoke and harmful gases, thus becoming the main reason that hinders people from escaping from the fire.

In response to the above-referenced technical inadequacies, the exterior of the plastic pipeline of the building should be covered or coated with a fireproof material. In addition to suppressing rapid spread of flames, the fireproof material can also reduce the generation of smoke and harmful gases, and thus people can have enough time to extinguish or escape from the fire. Although the fireproof material in the related art is a single-layer fireproof cladding material or a multi-layer fireproof cladding material, it is not suitable for covering or coating the plastic pipeline of the building.

For example, the single-layer fireproof cladding material of the related art is made of flame-resistant fiber, and has a flame-resistant fiber product such as PAN oxidized fiber, ceramic fiber and water-soluble alkaline earth fiber. These flame-resistant fibers are short fibers. Although they have excellent fireproof functions, the mechanical strength is worse than that of ordinary long fibers, which causes problems such as breakage and damage during transportation or construction. In particular, in order to prevent chipping and damage of the products, the exterior of these flame resistant fiber products needs to be laminated with aluminum foil or aluminum sheets, so that softness and bendability of these flame resistant fiber products are poor, and that these flame resistant fiber products are not suitable for covering or coating the plastic pipeline of the building.

The multi-layer fireproof cladding material of the related art is, for example, a three-layer laminated structure optical cable and a cable fireproof blanket disclosed in the Chinese patent for utility model CN202982995U. In the laminated structure, an inorganic fiber needle-punched blanket is used as an intermediate heat-insulating layer, and upper and lower sides of the intermediate heat-insulating layer are made of decorative layers made of inorganic fiber fabric. However, fireproofing of such fireproof blanket is only applicable to the covering of the optical cable and the cable, and is not suitable for covering or coating the plastic pipeline of the building.

In the related art, aside from the above-mentioned fireproof cladding material, there is an endothermic fireproof and an intumescent fireproof cladding material with excellent fireproofing effect and high price, and exterior of which is also completely covered with aluminum foil. Thus the endothermic and intumescent fireproof cladding materials also have the problems of poor softness and poor bendability, and are not suitable for covering or coating the plastic pipeline of the building.

SUMMARY OF THE DISCLOSURE

In response to the above-referenced technical inadequacies, the present disclosure provides a fireproof cladding material for coating a plastic pipeline of a building.

In one aspect, the present disclosure provides a fireproof cladding material for covering or coating a plastic pipeline including a cross-sectional structure formed by needle punch or thermal bond to form a two-layer or three-layer laminated structure with an integrated structure. The laminated structure of the cross-sectional structure is composed of a fireproof fiber woven blanket having a thickness of 0.2-250 mm, and an upper side or a lower side of the fireproof fiber woven blanket, or both sides of the upper side and the lower side thereof, is composed of a fireproof reinforcement layer having a thickness of 0.015-0.5 mm. The fireproof fiber woven blanket is selected from a PAN oxidized fiber woven carpet, a ceramic fiber woven blanket and a water-soluble alkaline earth fiber woven blanket, and the fireproof reinforcement layer is selected from a glass fiber cloth, a carbon fiber cloth and an enamel rubber.

In certain embodiments, a thickness of the fireproof fiber woven blanket is between 2 and 20 mm.

In certain embodiments, a thickness of the fireproof fiber woven blanket is between 0.1 and 0.3 mm.

In certain embodiments, the fireproof reinforcement layer is a glass fiber cloth or a carbon fiber cloth having a warp and weft density of 55×53 to 10×10.

In certain embodiments, the fireproof reinforcement layer is a glass fiber cloth or a carbon fiber cloth having a warp and weft density of 20×18 to 17×17.

In certain embodiments, a lower side of the fireproof fiber woven blanket is laminated with a flame-retardant double sided adhesive tape.

Therefore, the fireproof cladding material of the plastic pipeline of the present disclosure has the characteristics of softness, bendability, light weight and high strength, and is suitable for covering and coating the plastic pipeline of the building. Not only can the fireproof cladding material improve the flame resistance of the plastic pipeline of the building, but also reduce the spread of fire.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
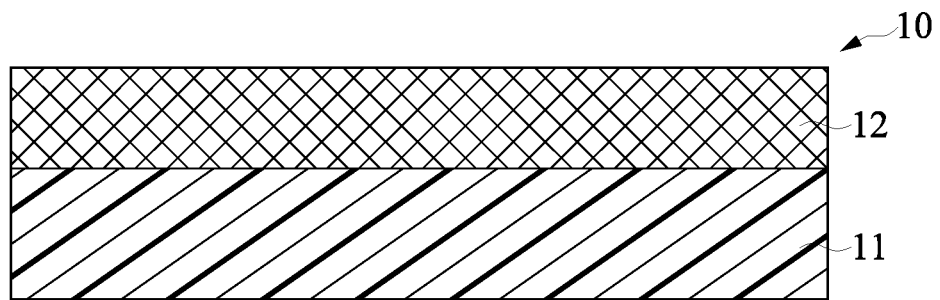
FIG. 1 is a diagram of an integrated double-layer laminated structure of a fireproof cladding material of a plastic pipeline of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
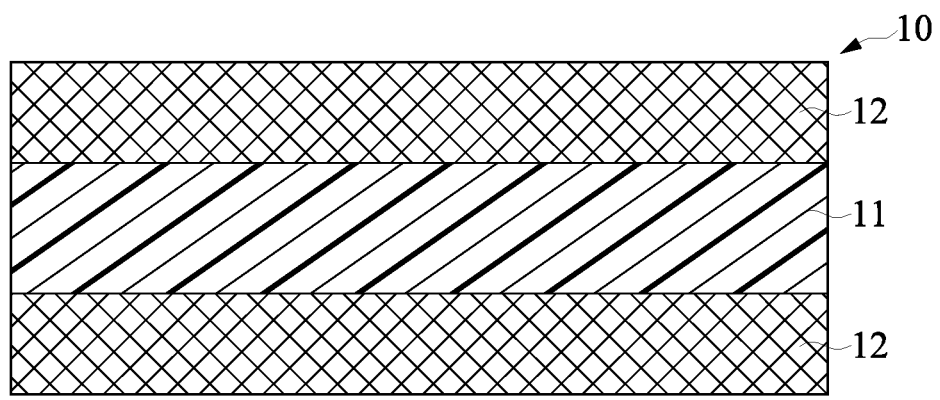
FIG. 2 is a diagram of an integrated three-layer laminated structure of the fireproof cladding material of the plastic pipeline of the present disclosure.
Figure 3:
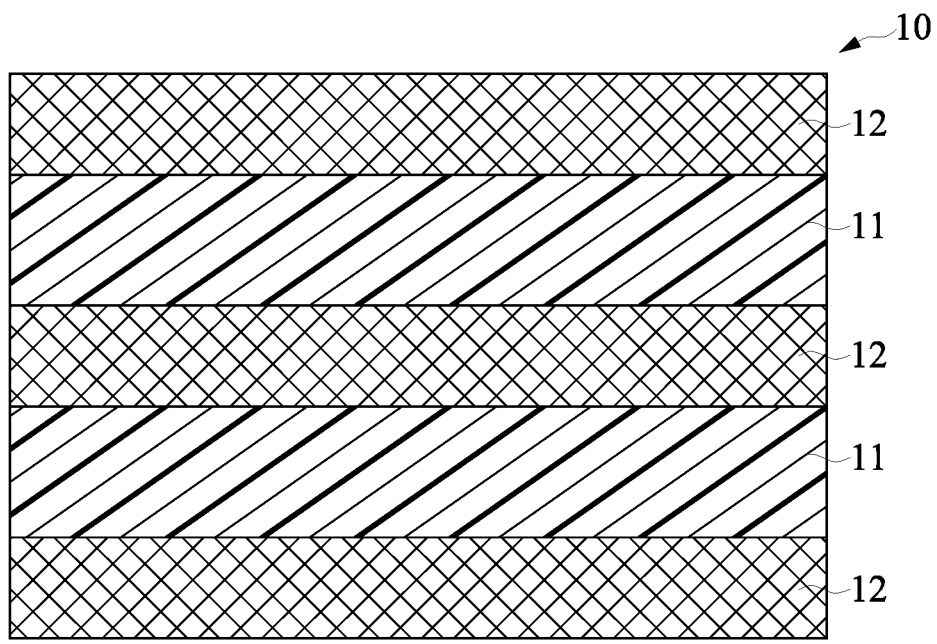
FIG. 3 is a diagram of an integrated five-layer laminated structure of the fireproof cladding material of the plastic pipeline of the present disclosure.

Referring to FIG. 1 to FIG. 3, a fireproof cladding material 10 of the present disclosure includes a cross-sectional structure which is a multi-layer composite structure having a double-layer or three-layer laminated fiber fabric product. In particular, adjacent different laminated structures in the multi-layer composite structure are formed into an integrated structure by needle punch or thermal bond in the related art.

When the fireproof cladding material 10 of the present disclosure is formed into the integrated structure by the needle punch, a mechanical strength and a softness between the laminated fiber fabric products can be adjusted based on a thickness of a needle bar of a needle punching machine, a number of times of pin punching, and the depth of the needle punching.

When the fireproof cladding material 10 of the present disclosure is formed into the integrated structure by the thermal bond, the mechanical strength and the softness between the laminated fiber fabrics are adjusted by infiltrating a predetermined depth between the adjacent laminated fiber fabrics by using a high temperature to infiltrate a silicone rubber.

As shown in FIG. 1, the fireproof cladding material 10 of the present disclosure has a double-layer laminated structure, and is composed of a fireproof fiber woven blanket 11 and a fireproof reinforcement layer 12. More specifically, the fireproof reinforcement layer 12 is laminated on an upper side or a lower side of the fireproof fiber woven blanket 11 by needle punch or thermal bond. Therefore the double-layer laminated structure having an integrated structure, excellent mechanical strength and softness is formed.

As shown in FIG. 2, the fireproof cladding material 10 of the present disclosure has a three-layer laminated structure, and is composed of one fireproof fiber woven blanket 11 and two fireproof reinforcement layers 12. More specifically, the fireproof reinforcement layer 12 is laminated on an upper side or a lower side of the fireproof fiber woven blanket 11 by needle punch or thermal bond; thereby the three-layer laminated structure having an integrated structure, excellent mechanical strength and softness is formed.

As shown in FIG. 3, the fireproof cladding material 10 of the present disclosure has a five-layer laminated structure, and is composed of two fireproof fiber woven blankets 11 and three fireproof reinforcement layers 12. More specifically, the fireproof fiber woven blankets 11 is stacked in the middle of the two fireproof reinforcement layer 12 by needle punch or thermal bond; thereby the three-layer laminated structure having an integrated structure, excellent mechanical strength and softness is formed.

The fireproof cladding material 10 of the present disclosure is for coating or covering a plastic pipeline. A thickness of the fireproof fiber woven blanket 11 is between 0.2 and 250 mm, preferably between 2 and 20 mm. The fireproof fiber woven blanket is selected from a PAN oxidized fiber woven carpet, a ceramic fiber woven carpet and a water-soluble alkaline earth fiber woven blanket, and has excellent flame resistance and heat insulation performance.

A thickness of the fireproof reinforcement layer 12 is between 0.015 and 0.5 mm, preferably between 0.1 and 0.3 mm, and is selected from a glass fiber cloth and a carbon fiber cloth, and has excellent flame resistance and tortuosity. When the fireproof reinforcement layer 12 and the fireproof fiber woven blanket 11 are integrally formed by needle punch, if the thickness of the fireproof reinforcement layer 12 is too thin, a hole is easily generated; if the thickness of the fireproof reinforcement layer 12 is too thick, the needle of the needle punch machine wears too fast, which makes the quality of the needle punch difficult to be controlled.

A warp and weft density of the glass fiber cloth or the carbon fiber cloth (that is, the number of yarns per unit length of the cloth surface, expressed as "wpi×fpi"), is between 55×53 and 10×10, preferably between 20×18 to 17×17. "wpi (warps per inch)" refers to the number of warp yarns per 1 inch of the fabric in the horizontal direction, and "fpi (fillings per inch)" refers to the number of weft yarns per 1 inch of the fabric in the longitudinal direction.

The higher the warp and weft density of the fireproof reinforcement layer 12 is, the higher the mechanical strength is. When the fireproof reinforcement layer 12 and the fireproof fiber woven blanket 11 are formed into an integrated structure by needle punch, the hole is more likely to be formed. As a result, the glass fiber or the carbon fiber is broken and peeled off, so that the mechanical strength of a finished product is rather decreased.

In the fireproof cladding material 10 of the present disclosure, the fireproof reinforcement layer 12 in the laminated structure may be replaced by silicone rubber. The silicone rubber is applied to the surface of the fireproof fiber woven blanket 11 by a high temperature to form a fireproof surface layer of the fireproof fiber woven blanket 11.

The fireproof cladding material 10 of the present disclosure not only has the characteristics of heat insulation and fireproofing, but also has the characteristics of softness, bendability, light weight and high strength, and is suitable for covering or coating the plastic pipeline of a building. The plastic pipeline that suppresses or delays burning of the flame to the building helps reduce the generation of smoke and harmful gases.

Figure 4:
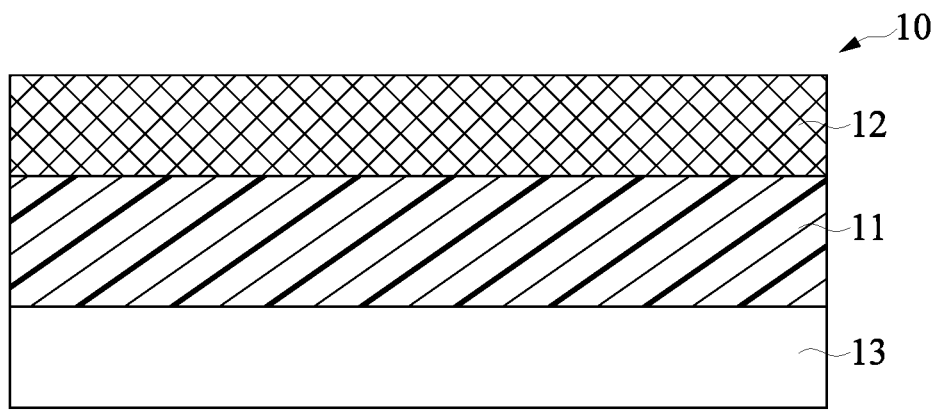
FIG. 4 is a diagram of the fireproof cladding material of the plastic pipeline of the present disclosure that can be attached to a flame-retardant double sided adhesive tape.

As shown in FIG. 4, in order to facilitate the construction of the subsequent coated plastic pipeline, the fireproof cladding material 10 of the present disclosure can be attached to a flame-retardant double sided adhesive tape 13.

Samples of the fireproof cladding material prepared in the embodiments and comparative examples are evaluated according to following test methods for physical properties of the fireproof cladding material.

Tear Strength (Kg) Test:

Test pieces of the same size (200 mm in length and 76 mm in width) are cut from a longitudinal direction and a transverse direction of the samples. An opening of about 50 mm is cut from the center of the width of each test piece along a length direction. Cut ends of the test piece are clamped on a tensile tester, and a highest data is recorded after pulling down to break at a speed of 200 mm/min.

Tensile Strength (Kg/3 cm) Test:

Test pieces of the same size (150 mm in length and 30 mm in width) are cut from a longitudinal direction and a transverse direction of the samples. A distance between the upper and lower clamps of the tensile testing machine is adjusted to be 100±2 mm, the test piece are clamped on a tensile tester, and the highest data is recorded after pulling down to break at a speed of 200±20 mm/min.

Elongation (%) Test:

After the test pieces are broken by the tensile test, the distance after the original mark of 100 mm is elongated is measured, and the elongation is calculated according to the following formula.

Elongation (%)=((break extension distance−original mark(100 mm))/original mark(100 mm))*100.

Breaking Strength (kg/cm$^2$) Test:
(1) Test piece: The test piece has a length of 100±2 mm and a width of 100±2 mm.
(2) A clamping pressure is controlled at 6±1 kg/cm$^2$.
(3) Test method:
   a. Place the test piece on a test stand of the break test machine, face up, and confirm that a red pointer of a pressure gauge is at zero position.
   b. Press down a pressure rod to press a pressure seat on the test piece. When the rubber diaphragm rises and breaks the test piece, immediately press the pressure rod to a depressurization position. The pressure seat will rise, the rubber diaphragm will be depressurized, and the red pointer position data of the pressure gauge will be read.

Flame Resistance Test:

A cone calorimeter is used to test a heat release rate of the material after various heating times in accordance with ASTM E 1354. Under a heating condition of 50 kW (kW)/m$^2$, the test materials are heated for 20 minutes, 10 minutes and 5 minutes respectively, and the heat resistance grade is determined according to the heating conditions of the test materials satisfying the following standard requirements 1 to 3:

1. A total heat release of the material is 8 MJ (mega joules)/m$^2$ or less;
2. The maximum heat release rate exceeds 200 kW/m$^2$ for less than 10 seconds;
3. There are no cracks and holes on the back of the test material.

Heat resistance grade of the test materials is divided into the following three grades:

A. Heat resistance grade 1, which means that the test material can meet the above-mentioned standard requirements 1 to 3 after heating for 20 minutes;

B. Heat-resistant grade 2, which means that the test material can meet the above-mentioned standard requirements 1 to 3 after heating for 10 minutes;

C. Heat-resistant grade 3 which means that the test material can meet the above-mentioned standard requirements 1 to 3 after heating for 5 minutes;

First Embodiment

As shown in FIG. 1, a fireproof cladding material having a double-layer laminated structure is obtained by needle punch, and the laminated structure thereof includes a PAN oxidized fiber woven blanket having a thickness of 2 mm and a plain woven glass fiber cloth having a thickness of 0.2 mm. The plain woven glass fiber cloth has a warp and weft density of 17×17.

Physical properties are evaluated, and the results are shown in Table 1.

Second Embodiment

As shown in FIG. 1, a fireproof cladding material having a double-layer laminated structure is obtained by needle punch, and the laminated structure thereof includes a ceramic fiber woven blanket having a thickness of 2 mm and a plain woven carbon fiber cloth having a thickness of 0.1 mm. The plain woven carbon fiber cloth has a warp and weft density of 12.5×12.5.

Physical properties are evaluated, and the results are shown in Table 1.

Third Embodiment

A silicone rubber is used to form a fireproof surface of a fireproof fiber woven blanket. As shown in FIG. 3, a fireproof cladding material having a five-layer laminated structure is obtained by thermal bond, and the laminated structure includes two water-soluble alkaline earth fiber woven blankets having a thickness of 2 mm, and a surface of each water-soluble alkaline earth fiber woven blanket is a silicone rubber fireproof surface layer having a thickness of 0.1 mm.

Physical properties are evaluated, and the results are shown in Table 1.

Fourth Embodiment

The fireproof cladding material prepared in the first embodiment is taken as a sample, and a flame-retardant double sided adhesive tape is attached to the lower side of a PAN oxidized fiber woven carpet.

Physical properties are evaluated, and the results are shown in Table 1.

Comparative Example 1

A PAN oxidized fiber woven blanket with a thickness of 2 mm is a single-layer fireproof cladding material, and no longer combined with the fireproof reinforcement layer.

Physical properties are evaluated, and the results are shown in Table 1.

Comparative Example 2

A commercially available ceramic fiber blanket having a thickness of 6 mm is a single-layer structure fireproof cladding material, and no longer composite fireproof reinforcement layer.

Physical properties are evaluated, and the results are shown in Table 1.

Comparative Example 3

As shown in FIG. 1, a fireproof cladding material having a double-layer laminated structure is obtained by needle punch, and the laminated structure thereof includes a PAN oxidized fiber woven blanket having a thickness of 2 mm and a plain woven glass fiber cloth having a thickness of 0.03 mm. The plain woven glass fiber cloth has a warp and weft density of 56×56.

Physical properties are evaluated, and the results are shown in Table 1.

Comparative Example 4

As shown in FIG. 1, a fireproof cladding material having a double-layer laminated structure is obtained by needle punch, and the laminated structure thereof includes a ceramic fiber woven blanket having a thickness of 2 mm and a plain woven carbon fiber cloth having a thickness of 0.5 mm. The plain woven carbon fiber cloth has a warp and weft density of 6.25×6.25.

Physical properties are evaluated, and the results are shown in Table 1.

Comparative Example 5

Different from the needle punch method of the first embodiment, a fireproof cladding material having a double-layer laminated structure is obtained by using a refractory fiber line by a sewing method, and the laminated structure thereof includes a PAN oxidized fiber woven blanket having a thickness of 2 mm and a plain woven glass fiber cloth having a thickness of 0.2 mm. The plain woven glass fiber cloth has a warp and weft density of 17×17.

Physical properties are evaluated, and the results are shown in Table 1.

TABLE 1

| | Composition and physical properties | | | | | | | | | |
|---|---|---|---|---|---|---|---|---|---|---|
| | | Embodiment | | | | Comparative example | | | | |
| | Composition | 1 | 2 | 3 | 4 | 1 | 2 | 3 | 4 | 5 |
| fireproof fiber woven blanket | Thickness of PAN oxidized fiber woven blanket (mm) | 2 | — | — | 2 | 2 | — | 2 | — | 2 |
| | Thickness of ceramic fiber woven blanket (mm) | — | 2 | — | — | — | 6 | — | 2 | — |
| | Thickness of water-soluble alkaline earth fiber woven blanket (mm) | — | — | 2 | — | — | — | — | — | — |
| fireproof reinforcement layer | Thickness of glass fiber cloth (mm) | 0.2 | — | — | 0.2 | — | — | 0.03 | — | 0.2 |
| | Thickness of carbon fiber cloth (mm) | — | 0.1 | — | — | — | — | — | 0.5 | — |
| | Thickness of silicone rubber (mm) | — | — | 0.1 | — | — | — | — | — | — |
| | Thickness of Flame resistant double-sided adhesive (mm) | — | — | — | 0.1 | — | — | — | — | — |
| Reinforcement processing | warp and weft density | 17 × 17 | 12.5 × 12.5 | — | 17 × 17 | — | — | 56 × 56 | 6.25 × 6.25 | 17 × 17 |
| | needle punch | v | v | — | v | — | — | v | v | — |
| | Thermal bond | — | — | v | — | — | — | — | — | — |
| | sewing | — | — | — | — | — | — | — | — | v |
| | attach | — | — | — | v | — | — | — | — | — |
| Fireproof material physical properties | structure layer | 2 | 3 | 5 | 3 | 1 | 1 | 2 | 3 | 3 |
| | Longitudinal tear strength (kg) | 9.1 | 12.3 | 15.2 | 11.8 | 1.8 | 1.0 | 3.2 | 7.8 | 2.0 |
| | Transverse tear strength (kg) | 8.1 | 11.8 | 15.8 | 10.9 | 1.2 | 0.8 | 2.5 | 8.1 | 1.5 |
| | Longitudinal tensile strength (kg/3 cm) | 10.8 | 13.5 | 20 | 12.2 | 3.0 | 1.8 | 4.6 | 8.5 | 3.5 |
| | Transverse tensile strength (kg/3 cm) | 15.3 | 17.4 | 24.7 | 17.8 | 5.0 | 3.2 | 6.9 | 9.8 | 3.5 |
| | Longitudinal elongation (%) | 71 | 73 | 90 | 75 | 70 | 51 | 70 | 71 | 70 |
| | Transverse elongation (%) | 73 | 72 | 90 | 78 | 70 | 50 | 70 | 73 | 70 |
| | Breaking strength (kg/cm$^2$) | 15 | 23 | 35 | 20 | 4 | 2 | 6 | 8 | 4.5 |
| | Flame resistance rating (cone calorimeter) | 1 | 1 | 1 | 1 | 2 | 1 | 2 | 1 | 1 |
| appearance and texture of fireproof cladding material | | good | good | good | good | good | coarse | coarse | coarse | good |
| General comment | | good | good | good | good | poor | poor | poor | fair | poor |
| Remarks | Appearance and texture of fireproof cladding material is based on a direct contact of palm to see if there is any discomfort such as coarse or itchy to skin. | | | | | | | | | |

In conclusion, in the first embodiment, the fireproof cladding material having the double-layer laminated structure is obtained by needle punch. The laminated structure thereof not only includes the PAN oxidized fiber woven blanket having the thickness of 2 mm but also the plain woven glass fiber cloth having the warp and weft density of 17×17. Compared with the fireproof cladding material of Comparative Example 1 using only the PAN oxidized fiber woven carpet, or the fireproof cladding material of the single-layer layer structure of the ceramic fiber woven blanket of Comparative Example 2, the mechanical strength such as tear strength, tensile strength and breaking strength of the fireproof cladding material of the first embodiment is effectively improved. In particular, the fireproof cladding material of the first embodiment has excellent texture, softness, bendability, light weight and high strength, and is suitable for covering or coating plastic pipelines. The fireproof cladding material of the first embodiment also has a flame resistance rating in the first grade, and a fireproofing effect for reducing the spread of fire.

In the first embodiment, the fireproof cladding material having the double-layer laminated structure is obtained by needle punch. Compared with the fireproof cladding material of Comparative Example 5 obtained by the sewing method, the mechanical strength such as tear strength, tensile strength and breaking strength of the fireproof cladding material of the first embodiment is effectively improved. The fireproof cladding material of the first embodiment also has a flame resistance rating in the first grade, and a fireproofing effect for reducing the spread of fire. In contrast, the fireproof cladding material of Comparative Example 5 cannot effectively reduce the spread of fire even when used for covering or coating a plastic pipeline.

In the second embodiment, the fireproof cladding material having the three-layer laminated structure is obtained by needle punch. The laminated structure thereof not only includes a ceramic fiber woven blanket having a thickness of 2 mm but also the plain woven carbon fiber cloth having the warp and weft density of 12.5×12.5. Compared with the fireproof cladding material of Comparative Example 4 using the carbon fiber cloth having a warp and weft density of 6.25×6.25 to obtain the three-layered layer structure, the mechanical strength such as tear strength, tensile strength and breaking strength of the fireproof cladding material of the second embodiment is effectively improved. The carbon fiber cloth has a warp and weft density that is not less than 10×10.

Compared with the fireproof cladding material having the double-layer laminated structure obtained by needle punch in the first embodiment, the fireproof cladding material of the Comparative example 3 has the warp and weft density of 56×56. The flame resistance rating is in the second grade, which means that the warp and weft density of the glass fiber cloth should not be higher than 55×53.

The fireproof cladding material of the third embodiment obtains a fireproof cladding material by thermal bond. The surface of the water-soluble alkaline earth fiber woven blanket uses the silicone rubber as the fireproof surface layer, which has excellent tear strength, tensile strength and breaking strength. The flame resistance grade thereof is in the first grade which is suitable for covering or coating plastic pipelines and can reduce the spread of fire.

In the fourth embodiment, the fireproof cladding material prepared in the first embodiment is taken as a sample, and a flame-retardant double sided adhesive tape is attached to the lower side of a PAN oxidized fiber woven carpet. Compared with the fireproof cladding material of the first embodiment the mechanical strength such as tear strength, tensile strength and breaking strength of the fireproof cladding material of the fourth embodiment is slightly improved, which facilitates a subsequent construction of coating the plastic pipeline. The fireproof cladding material of the fourth embodiment also has a flame resistance rating in the first grade, and a fireproofing effect for reducing the spread of fire.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fireproof cladding material for covering or coating a plastic pipeline, including a cross-sectional structure formed by needle punch or thermal bond to form a two-layer or three-layer laminated structure with an integrated structure, wherein the laminated structure of the cross-sectional structure is composed of a fireproof fiber woven blanket having a thickness of 0.2-2 mm, and an upper side or a lower side of the fireproof fiber woven blanket, or both sides of the upper side and the lower side thereof, is composed of a fireproof reinforcement layer having a thickness of 0.015-0.2 mm; wherein the fireproof fiber woven blanket is selected from a PAN oxidized fiber woven carpet and a water-soluble alkaline earth fiber woven blanket, and the fireproof reinforcement layer is selected from a glass fiber cloth, a carbon fiber cloth and a silicone rubber.

2. The fireproof cladding material according to claim 1, wherein the fireproof reinforcement layer is a glass fiber cloth or a carbon fiber cloth having a warp and weft density of 55×53 to 10×10.

3. The fireproof cladding material according to claim 1, wherein the fireproof reinforcement layer is a glass fiber cloth or a carbon fiber cloth having a warp and weft density of 20×18 to 17×17.

4. The fireproof cladding material according to claim 1, wherein a lower side of the fireproof fiber woven blanket is laminated with a flame-retardant double sided adhesive tape.

* * * * *